US005498679A

United States Patent [19]
Moffat et al.

[11] Patent Number: 5,498,679
[45] Date of Patent: Mar. 12, 1996

[54] PROCESS FOR PRODUCING TELECHELIC, BRANCHED AND STAR THERMOPLASTIC RESIN POLYMERS

[75] Inventors: Karen A. Moffat, Brantford; Peter M. Kazmaier; Gordon K. Hamer, both of Mississauga; Michael K. Georges, Guelph, all of Canada

[73] Assignee: Xerox Corporation, Stamford, Conn.

[21] Appl. No.: 413,753

[22] Filed: Mar. 30, 1995

[51] Int. Cl.⁶ .................................................. C08F 2/38
[52] U.S. Cl. .................... 526/204; 526/190; 525/256; 525/267
[58] Field of Search ............................ 526/204, 190; 525/256, 267

[56] References Cited

U.S. PATENT DOCUMENTS

| | | | |
|---|---|---|---|
| 4,581,429 | 4/1986 | Solomon et al. | 526/220 |
| 4,777,230 | 10/1988 | Kamath | 526/86 |
| 5,322,912 | 6/1994 | Georges et al. | 526/204 |

OTHER PUBLICATIONS

D. Solomon et al., "A New Method for Investigating the Mechanism of Initiation of Radical Polymerization," *Polymer Bulletin*, vol. 1, pp. 529–534 (1979).
P. Griffiths et al., "Initiation Pathways in the Polymerization of Alkyl Methacrylates with tert–Butoxy Radicals," *J. Macromol. Sci.–Chem.*, A17(1), pp. 45–50 (1982).
G. Moad et al., "Selectivity of the Reaction of Free Radicals with Styrene," *Macromolecules*, vol. 15, pp. 909–914 (1982).
G. Moad et al., "The Reaction of Acyl peroxides with 2,2,6,6-tetramethyl–piperidinyl–1–oxy," *Tetrahedron Letters*, vol. 22, pp. 1165–1168 (1981).
G. Moad et al., "The Reaction of Benzoyloxy Radicals with Styrene—Implications Concerning the Structure of Polystyrene," *J. Macromol. Sci.–Chem.*, A17(1), pp. 51–59 (1982).
P. Griffiths et al., "Synthesis of the Radical Scavenger 1,1,3,3–tetramethylisoindolin–2–yloxyl," *Aust. J. Chem.*, vol. 36, pp. 397–401 (1983).
G. Moad et al., "Reactions of Benzoyloxy Radicals With Some Common Vinyl Monomers." *Makromol Chem. Rapid Commun.*, vol. 3, pp. 533–536 (1982).
P. Griffiths et al., "Quantitative Studies of Free Radical Reactions With the Scavenger 1,1,3,3,–tetramethyl–isoindolinyl–2–oxy," *Tetrahedron Letters*, vol. 23, pp. 1309–1312 (1982).
E. Rizzardo et al., "Initiation Mechanisms in Radical Polymerizations: Reaction of Cumyloxy Radicals with Methyl Methacrylate and Styrene," *Aust. J. Chem.*, vol. 35, pp. 2013–2024 (1982).
M. Cuthbertson et al., "Head Addition of Radicals to Methyl Methacrylate," *Polymer Bulletin*, vol. 6, pp. 647–651 (1982).

G. Moad et al., "On the Regioselectivity of Free Radical Processes; Reactions of Benzoyloxy, Phenyl and t–Butoxy Radicals with Some $\alpha,\beta$–Unsaturated Esters," *Aust. J. Chem.*, vol. 36, pp. 1573–1588 (Aug. 1983).
A. V. Trubnikov et al., "Inhibition of Polymerization of Vinyl Monomers Using Nitride and Iminoxide Radicals," *Vysokomol. Soedin.*, Ser. A, vol. 20, No. 11, pp. 2448–2454 (1978).
E. G. Rozantsev et al., "Synthesis and Reactions of Stable Nitroxyl Radicals II. Ractions," *Synthesis*, pp. 401–414 (Aug. 1971).
G. Moad et al., "A Product Study of the Nitroxide Inhibited Thermal Polymerization of Styrene," *Polymer Bulletin*, vol. 6, pp. 589–593 (1982).
R. Grant et al., "Solvents Effects on the Reaction of t–Butoxy Radicals with Methyl Methacrylate," *Aust. J. Chem.*, vol. 36, pp. 2447–2454 (1983).
S. Bottle et al., "The Mechanism of Initiation in the Free Radical Polymerization of N–Vinylcarbazole and N–Vinylpyrrolidone," *European Polymer J.*, vol. 25, pp. 671–676 (1989).
M. D. Gol'dfein et al., "Inhibition of Styrene Polymerization by the Stable Radical 4,4'–diethoxydiphenylnitroxide," *Vysokomol. Soedin.*, Ser. A, vol. 16, No. 3, pp. 672–676 (1974).
M. D. Gol'dfein et al., "Effect of Free Stable Radicals on the Kinetics and Mechanism of Polymerizaton of Some Vinyl Monomers," *Vysokomol. Soedin.*, Ser. A, vol. 17, No. 8, pp. 1671–1671 (1975).
A. V. Trubnikov et al., "Effect of Stable Radicals on Polymerization of Styrene," *Vysokomol. Soedin.*, Ser. B, vol. 18, No. 6, pp. 419–422 (1976).
A. V. Trubnikov et al., "Mechanism of Inhibition of Vinyl Monomer Polymerization by Stable Radicals," *Vysokomol. Soedin.*, Ser. B, vol. 18, No. 10, pp. 733–736 (1976).
J. Edgar Anderson et al., "Enclosed Ground–State Conformations of the tert–Butyl–X Bond in N–tert–Butoxy– and N–Neopentyl–2,2,6,6–tetramethylpiperidine. X–ray Crystal Structure Determinations and Molecular Mechanics Calculations," J. Am. Chem. Soc. 115, pp. 3494–3498 (1993).
George G. Odian, "Principles Of Polymerization," pp. 269–273, (1981).

*Primary Examiner*—Mark Nagumo
*Attorney, Agent, or Firm*—Oliff & Berridge

[57] ABSTRACT

A free radical polymerization process for the preparation of a thermoplastic resin or resins includes heating a mixture of a multifunctional nitroxide compound and at least one polymerizable monomer compound to form a thermoplastic resin or resins; cooling the mixture; and optionally isolating and washing and drying the thermoplastic resin. A multifunctional nitroxide compound for use in the reaction is formed from a stable free radical agent and a compound having one or more halide functional groups. The free radical polymerization process may be used to prepare telechelic, branched and star polymers.

18 Claims, No Drawings

PROCESS FOR PRODUCING TELECHELIC, BRANCHED AND STAR THERMOPLASTIC RESIN POLYMERS

BACKGROUND OF THE INVENTION

This invention relates to polymers with controlled narrow molecular weight distributions, and a polymerization process for producing such compositions. More specifically, the present invention relates to telechelic, branched and star polymers, and a process for preparing the polymers using an initiator/capping reagent to initiate the polymerization reaction and reversibly cap the propagating chain. This invention also relates to a method for preparing the initiator/capping reagent and then conducting the polymerization process either with or without isolating the reagent. The process is particularly useful in the production of thermoplastic polymer resins for use in a wide variety of thermoplastic applications.

The thermoplastic polymer resin compositions of the present invention may be formed into a variety of thermoplastic products, for example by known processes such as injection and blow molding processes. Examples of such thermoplastic products include resins for electrostatographic toner and developer compositions; narrow polydispersity polymers for applications including, but not limited to, adhesive formulations, surfactants and viscosity modifiers; and monomodal or multimodal resins for use in thermoplastic films and coating technologies.

One way to prepare polymers or copolymers having a narrow molecular weight distribution or polydispersity is by anionic processes. However, the use and availability of resins having narrow polydispersities in industrial applications is limited because anionic polymerization processes must be performed in the absence of atmospheric oxygen and moisture, and because they require hazardous initiator reagents that are difficult to handle. Consequently, such anionic polymerization processes are generally limited to batch reactors. In addition, the monomers and solvents that are used must be anhydrous and of high purity, rendering the anionic process more expensive than alternative processes that do not have these requirements. Thus, anionic polymerization processes are difficult and costly. It is therefore desirable to have a free radical polymerization process that would provide narrow molecular weight distribution resins that overcome the shortcomings and disadvantages of the aforementioned anionic polymerization processes.

Free radical polymerization processes are chemically less sensitive to impurities in the monomers or solvents typically used and are completely insensitive to water. Consequently there has been a long felt need for an economical free radical polymerization process that is suitable for preparing narrow polydispersity resins by suspension, solution (bulk or neat), emulsion and related processes.

Most copolymers prepared by free radical polymerization processes have broad molecular weight distributions or polydispersities, for example greater than about four or five. One reason is that free radical initiators have half lives that are relatively long, from several minutes to many hours, and polymeric chains are not all initiated at the same time. As a result, the free radical initiators provide growing chains of various lengths at any given time during the polymerization process. Another reason for the relatively high polydispersities is that the reaction rate in most free radical polymerizations is very high from the start of the reaction, thus quickly forming high molecular weight polymer chains. The propagating chains then tend to react with each other in processes known as coupling and disproportionation, both of which are chain terminating reactions. In doing so, chains are terminated at different times during the polymerization reaction process, which results in resin products having a high polydispersity. Furthermore, "dead" (non-reactive) polymer is formed very early in the reaction process, sometimes within milliseconds of initiation of the reaction, thus producing polymer in the early stages of the reaction having molecular weights that are different from the molecular weight of polymer formed at the end of the reaction. The different molecular weight polymers are generally caused by changes in process conditions during the course of the reaction, such as changes in the viscosity/monomer concentration and heat transfer properties of the reaction medium. The result is a further broadening of the polydispersity of resins prepared in the conventional way.

If a free radical polymerization process is to be enabled for producing narrow molecular weight distributions, then all polymer chains in the reaction must be initiated at about the same time and premature termination by coupling or disproportionation processes must be avoided.

In a hypothetical free radical polymerization of styrene, in which chains are continually initiated over the course of the polymerization, and where chain termination by coupling processes is also occurring, calculations have shown that the narrowest polydispersity that one can theoretically possibly obtain is 1.5. Such calculations are described in, for example, G. G. Odian, *Principles of Polymerization*, pages 280–281., 2nd Ed., John Wiley & Sons, 1981. In practice, polydispersities greater than 1.5 are actually obtained. Polydispersities of between 2.0 and 2.4 are typical for free radical homopolymerizations of styrene. In the case of copolymer systems, polydispersities of greater than 4 are generally obtained.

The use of stable free radicals as inhibitors of free radical polymerization is known and is described, for example, in G. Moad et al., *Polymer Bulletin*, vol. 6, p. 589 (1982). Studies have also reported on the use of stable free radicals as inhibitors of free radical polymerization performed at low temperatures and at low monomer to polymer conversation rates. See, for example, G. Moad et al., *Macromol Sci.-Chem.*, A17(1), 51 (1982).

The stable free radicals are generally formed from precursor materials according to known reaction mechanisms. For example, the synthesis of nitroxides from amine precursors is described in E. G. Rozantsev and V. D. Sholle, *Synthesis*, 190–202 (1971) and E. J. Rauckman, G. M. Rosen and M. B. Abou-Donia, *Synthetic Communications*, 409–413 (1975). Other procedures for the synthesis of nitroxide include, for example, the oxidation of hydroxylamines, such as described in E. G. Rozantsev, *Free Nitroxyl Radicals*, 70–73 (Plenum Press, New York), and radical addition to Nitrones, for example as described in I. Iwamura and N. Inamoto, *Bulletin of the Chemical Society of Japan*, 40, 703 (1967). The disclosures of all of the preceding references are entirely incorporated herein by reference.

Roland P. T. Chung and David H. Solomon, "Recent Developments in Free-Radical Polymerization—A Mini Review," *Progress in Organic Coating*, vol. 21, pp. 227–254 (1992), presents an overview of the free radical polymerization process, with an emphasis on recent developments.

U.S. Pat. No. 5,322,912 to Georges et al. discloses a free radical polymerization process for the preparation of thermoplastic resins. The thermoplastic resins are disclosed as having a molecular weight of from 10,000 to 200,000 and a polydispersity of from 1.1 to 2.0. The process comprises heating a mixture of a free radical initiator, a stable free radical agent, and at least one polymerizable monomer compound to form a thermoplastic resin with a high monomer to polymer conversion ratio, and then cooling said mixture. The polymerization process is carried out at a temperature of from 60° to 160° C. and at a relatively low pressure of about 60 psi (about 4 bars). The process optionally comprises isolating the thermoplastic resin or resins and washing and drying the thermoplastic resin. The patent also discloses the preparation of mixtures and block copolymer thermoplastic resins using the free radical polymerization process. Resins produced by the disclosed process are described as having a narrow molecular weight distribution, and a modality that is controlled by the selection of the free radical initiator and stable free radical agent. As the stable free radical agent, the patent discloses the use of nitroxide free radicals such as PROXYL, TEMPO, and derivatives thereof.

U.S. Pat. No. 4,581,429 to Solomon et al. also discloses the incorporation of a stable free radical agent into a free radical polymerization process. The patent discloses that a nitroxide radical may be added to the polymerization process to stabilize the growth of polymer chains. The molecular weights of the polymer products obtained are generally from about 2,500 to 7,000 and have polydispersities generally of from about 1.4 to 1.8. The reactions typically have low monomer to polymer conversion rates and use relatively low reaction temperatures, of less than about 100° C., and use multiple stages.

U.S. Pat. No. 4,581,429 discloses a free radical polymerization process that controls the growth of polymer chains to produce short chain or oligomeric homopolymers and copolymers, including block and graft copolymers. The process employs an alkoxyamine initiator having the formula, in part, =N—O—X, where X is a free radical species capable of polymerizing unsaturated monomers. The reference discloses that the alkoxyamine free radical initiator may be formed in situ prior to its use in a free radical polymerization process by heating a nitroxide radical in the presence of a stoichiometric amount of carbon centered free radical (X). For example, the reference discloses the formation of the alkoxyamine free radical initiator 1-(1-cyano-1-methylethoxy)2,2,5,5-tetramethylpyrrolidine from a degassed solution in benzene of azobisisobutyronitrile and 2,2,5,5-tetramethylpyrrolidin-1-yloxy (the stable free radical agent PROXYL, which is equivalent to the structure 2,2,5,5-tetramethyl-1-pyrrolidinyloxy specified for PROXYL below). The reference also discloses the formation of the alkoxyamine free radical initiator 1-(1-cyano-4-hydroxy-1-methylbutoxy)2,2,6,6-tetramethylpiperidine from a degassed solution in ethyl acetone of 4,4'-azobis(4-cyano-n-pentanol) and 2,2,6,6-tetramethylpiperidin-1-yloxy (the stable free radical agent TEMPO, which is equivalent to the structure 2,2,6,6-tetramethyl-1-piperidinyloxy specified for TEMPO below).

U.S. Pat. No. 4,777,230 to Kamath discloses a free radical polymerization process for producing polymers, wherein monomers are blended with a solvent, polymerization initiators (such as peroxide initiators) and an optional chain transfer agent. The polymerization process is conducted at a temperature of from about 90° C. to about 200° C. The resultant polymers have a molecular weight distribution of from about 1.5 to about 2.5, and an average molecular weight of less than about 4,000.

In free radical polymerization reaction processes of the prior art, various significant problems exist. For example, difficulties exist in predicting or controlling the polydispersity and modality of the polymers produced. These free radical polymerization processes may produce polymers with a high weight average molecular weight ($M_w$) and a low number average molecular weight ($M_n$), resulting in a broad polydispersity. Further, bulk or neat free radical polymerization processes of the prior art are prone to generating excessive quantities of heat since the polymerization reaction is exothermic and the dissipation of heat becomes more difficult as the viscosity of the reaction mixture increases. This is referred to as the Trommsdorff effect, as discussed and illustrated in G. Odian, *Principles of Polymerization,* 2nd Ed., Wiley-lnterscience, New York, page 272 (1981), the disclosure of which is entirely incorporated herein by reference. Moreover, the exothermic nature of free radical polymerization processes is often a limitation that severely restricts the concentration of reactants or the reactor size upon scale-up.

It has been demonstrated that stable free radical polymerization processes can provide precise control over the molecular weight distribution of polymer chains. For example, U.S. Pat. No. 5,322,912, described above, describes polymerization processes that use stable free radicals to provide thermoplastic resins having a narrow molecular weight distribution. Although it is not desired to be limited by theory, it is believed that when polymerization reaction processes are performed at temperatures above about 100° C., all of the polymer chains are initiated at about the same time. Therefore, control of the reaction enables the formation of polymer chains having a precise molecular weight and a narrow molecular weight distribution. Incorporation of stable free radical agents in the polymerization process prevents the initiation of new polymer chains after an initial reaction during which all of the polymer chains are initiated at about the same time.

SUMMARY OF THE INVENTION

The need continues to exist in the thermoplastic resin industry for improved processes for the production of thermoplastic polymer resins and especially for telechelic, branched and star polymer resins. Although the stable free radical polymerization process achieves the goal of providing thermoplastic polymer resins with improved processing characteristics and narrow molecular weight distributions, it has not been applied to the formation of such telechelic, branched and star polymers. We have discovered that the telechelic, branched and star polymers may be prepared by generating a di- or multi-functional alkoxy or aryloxynitroxide compound, and using such component as both an initiating species and as a reversible terminating reagent in a stable free radical polymerization process. In embodiments, the generation of the multifunctional nitroxide compound may be performed in situ with the subsequent stable free radical polymerization process; that is, the stable free radical polymerization process may proceed directly from the multifunctional nitroxide compound generation step, for example in the same reactor vessel and without first isolating the multifunctional nitroxide compound. Such a process for producing the multifunctional nitroxide compound and a free radical polymerization process using that compound are provided herein to prepare improved telechelic, branched and star polymer resins.

In embodiments, this invention provides a free radical polymerization process for the preparation of a thermoplastic resin or resins, comprising:

heating a mixture of a multifunctional nitroxide compound and at least one polymerizable monomer compound to form said thermoplastic resin or resins;

cooling said mixture;

optionally isolating said thermoplastic resin; and optionally washing and drying said thermoplastic resin; wherein said multifunctional nitroxide compound is formed from a stable free radical agent and a compound having one or more halide functional groups.

The stable free radical polymerization process of the present invention may readily afford telechelic, branched and star polymers having polydispersities of between about 1.1 and 2.0, and at least as low as 1.5 for various polymer systems. Stable free radical polymerization systems of the present invention afford polydispersities that are comparable to those obtained in anionic polymerizations, but avoiding the above-described shortcomings and disadvantages of the artionic polymerization processes.

The thermoplastic polymer resins of the present invention are useful as substitutes for polymers and copolymers currently used in the thermoplastic resin industries. The stable free radical polymerization process disclosed herein is particularly useful in the production of such thermoplastic polymer resins having a narrow molecular weight distribution. The stable free radical polymerization process of the present invention, in embodiments, also advantageously combines the production of the multifunctional nitroxide component that serves as the initiating species and the reversible terminating reagent with the actual stable free radical polymerization process in a single reactor vessel, thus substantially reducing the cost of the polymerization process.

DETAILED DESCRIPTION OF PREFERRED EMBODIMENTS

The free radical polymerization process of the present invention may be used to prepare a variety of telechelic, branched and star polymers and copolymers with a variety of molecular architectures in a cost efficient manner. An advantage of the present invention is that the stable free radical polymerization process affords precise control over the molecular architecture of the polymer, including molecular weight, molecular weight distribution and modality. The polymers may generally be produced by the two-step process of: (a) generating a multifunctional nitroxide compound by reacting a nitroxide stable free radical agent with an alkyl or aryl halide or α-keto halide reagent having reactive halide functional groups, in the presence of a hydride generating compound; and (b) using the multifunctional nitroxide compound to polymerize one or more monomers by a stable free radical polymerization process. In embodiments, it may be possible to increase the efficiency of the polymerization process of the present invention by both generating the multifunctional nitroxide compound and polymerizing the monomer or monomers in the same reaction vessel, without first isolating the multifunctional nitroxide compound. These processes may, for example, be used to produce thermoplastic resins, including telechelic, branched and star polymer and block copolymer resins, having a number average molecular weight in the range of from about 1,000 to about 1,000,000.

Stable free radical agents are known in the literature. For example G. Moad et al., Tetrahedron Letters, 22, 1165 (1981), which is totally incorporated herein by reference, discloses stable free radical agents as free radical polymerization inhibitors. However, under the free radical polymerization conditions of the present invention, stable free radical agents function as moderators to harness the normally highly reactive and indiscriminate intermediate free radical species. Stable free radical agents as reaction moderators are disclosed in U.S. Pat. No. 5,322,912, the entire disclosure of which is incorporated herein by reference. Additionally, the stable free radical agents in the processes of the present invention, in the form of the multifunctional nitroxide compound, may function in embodiments as the initiating species for the stable free radical polymerization.

Preferred free radical agents for use in the present invention include those in the nitroxide group of free radicals, for example, PROXYL (2,2,5,5-tetramethyl-1-pyrrolidinyloxy) and derivatives thereof, TEMPO (2,2,6,6-tetramethyl-1-piperidinyloxy) and derivatives thereof, DOXYL (4,4-dimethyl-3-oxazolinyloxyl) and derivatives thereof, mixtures thereof and the like.

For use in processes of the present invention, the multifunctional nitroxide compound may be formed by any of various processes, such as those known in the art. For example, J. Anderson, et al., "Eclipsed Ground-State Conformations of the tert-Butyl-X Bond in N-tert-Butoxy- and N-Neopentyl-2,2,6,6-tetramethylpiperidine. X-ray Crystal Structure Determination and Molecular Mechanics Calculations," J. Am. Chem. Soc., 115, 3494–3498 (1993), provides a general discussion of the mechanism for synthesizing N-alkoxy or N-aryloxy derivatives of 2,2,6,6-tetramethylpiperidine, or monofunctional nitroxide compounds. A general mechanism for forming the multifunctional nitroxide compound will be described below; however, the formation of the compound is not limited thereto.

In embodiments, the multifunctional nitroxide compound may be formed by reacting a sufficient amount of a stable free radical agent with an alkyl or aryl halide reagent or an α-keto halide reagent, with the reagent containing halide functional groups. The choice of the specific halide reagent will depend, of course, upon the desired structure and properties of the final thermoplastic resin polymer, and whether the final polymer product is to be a telechelic, branched or star polymer. For example, in embodiments of the present invention, a multifunctional nitroxide compound formed from a halide reagent having two, three or six halide functional groups may be used to form a telechelic, branched or star polymer, respectively. However, the number and positioning of the halide functional groups in the reagent are not critical and are not limited to the specifically disclosed embodiments. Otherwise, the choice of the specific alkyl or aryl halide reagent or α-keto halide reagent is not critical, so long as the reagent contains the appropriate reactive halide functional groups and subsequently may form the multifunctional nitroxide compound.

An example of a reaction scheme for forming the multifunctional nitroxide compound from the halide reagent is generally shown below. Specifically, scheme (i) shows the formation of a di-functional nitroxide compound that may be used for forming a telechelic thermoplastic resin polymer. Similarly, schemes (ii) and (iii) show the formation of a trifunctional nitroxide compound and a hexa-functional nitroxide compound that may be used to form a branched or star thermoplastic resin polymer, respectively. As is evident from schemes (i)–(iii), in embodiments of the present invention utilizing the described reaction scheme, two molar equivalents of the stable free radical agent should be reacted per molar equivalent of reactive halide functional groups in the halide reagent. Thus, for example, the formation of the di-functional nitroxide compound in scheme (i) requires the reaction of four moles of the stable free radical agent TEMPO per mole of the di-halide reagent, since each mole of reagent contains two molar equivalents of reactive halide functional groups.

In these schemes, X represents a halide.

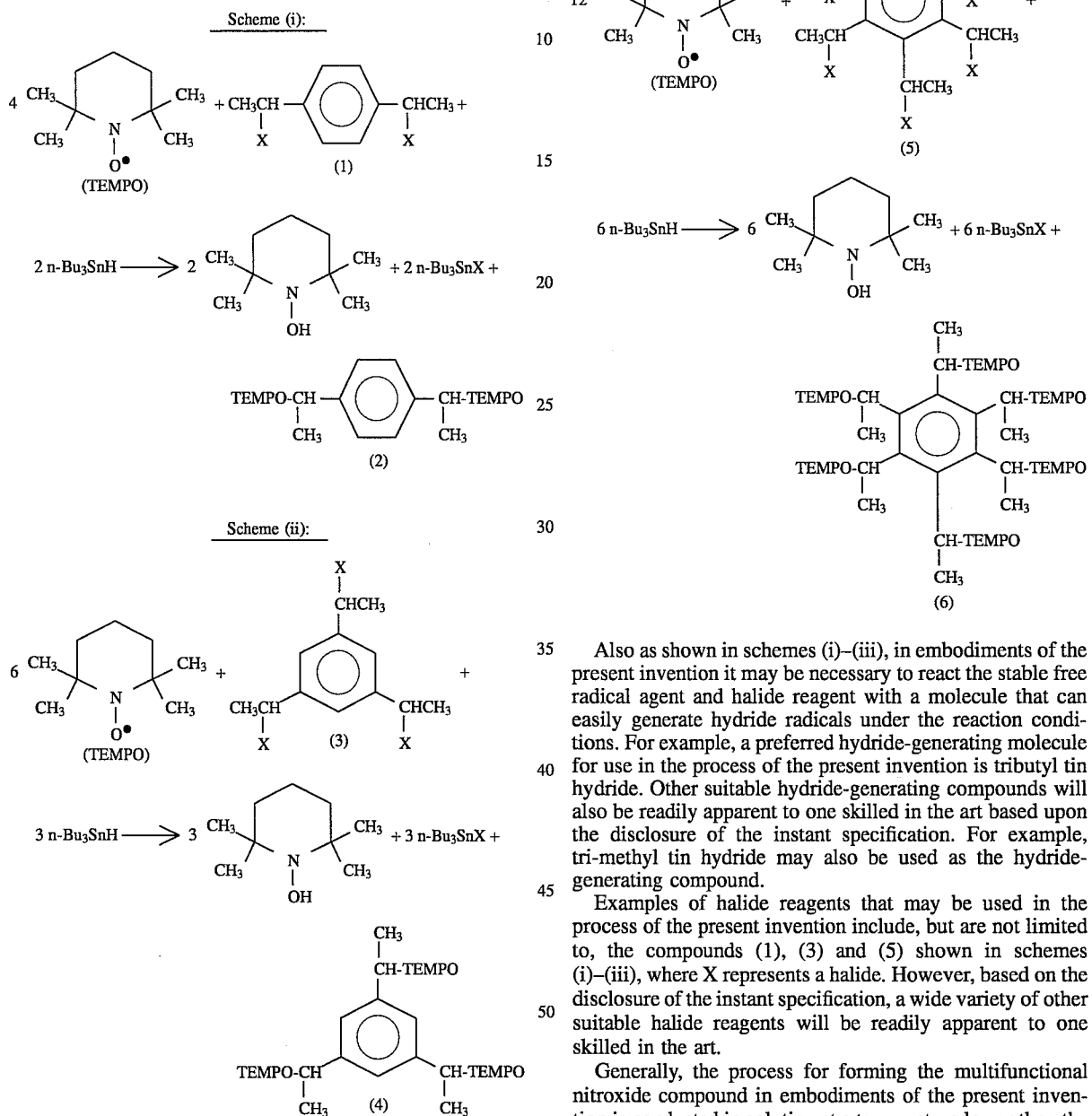

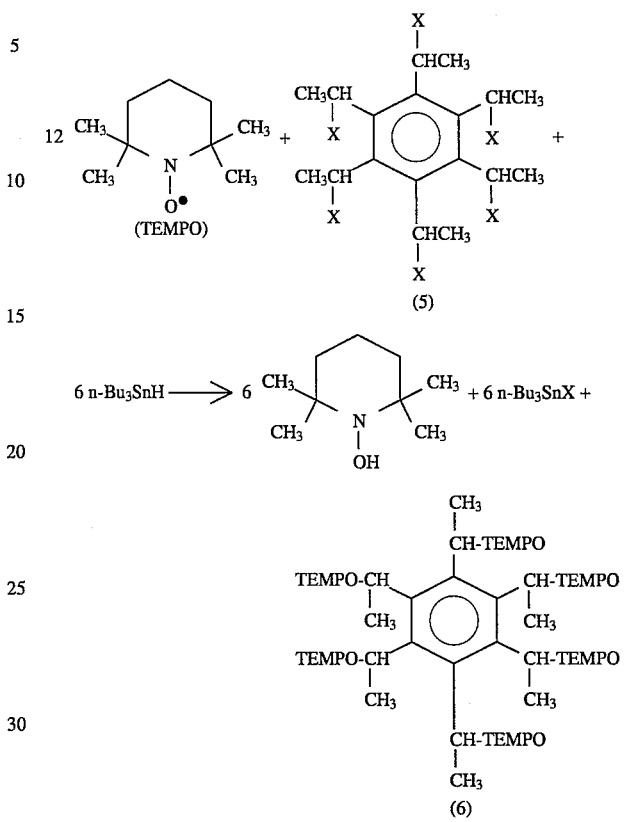

Also as shown in schemes (i)–(iii), in embodiments of the present invention it may be necessary to react the stable free radical agent and halide reagent with a molecule that can easily generate hydride radicals under the reaction conditions. For example, a preferred hydride-generating molecule for use in the process of the present invention is tributyl tin hydride. Other suitable hydride-generating compounds will also be readily apparent to one skilled in the art based upon the disclosure of the instant specification. For example, tri-methyl tin hydride may also be used as the hydride-generating compound.

Examples of halide reagents that may be used in the process of the present invention include, but are not limited to, the compounds (1), (3) and (5) shown in schemes (i)–(iii), where X represents a halide. However, based on the disclosure of the instant specification, a wide variety of other suitable halide reagents will be readily apparent to one skilled in the art.

Generally, the process for forming the multifunctional nitroxide compound in embodiments of the present invention is conducted in solution at a temperature lower than the temperature necessary for the stable free radical polymerization of the polymerizable monomer compounds. Thus, for example, the formation of the multifunctional nitroxide compound may preferably be conducted at a temperature below about 60° C., and more preferably below about 350° C. Even more preferably, the formation of the multifunctional nitroxide compound is conducted at a temperature at or below about 10° C.

The formation process may be conducted in solution form, with the solution being either reactive or non-reactive, or polymerizable or non-polymerizable, as desired. The selection of the solvent is not critical, and will depend upon such factors as the specific multifunctional nitroxide compound being formed, the precursor materials used to form the multifunctional nitroxide compound, and whether the multifunctional nitroxide compound is to be isolated from the solution prior to its use in the succeeding stable free radical polymerization process.

Once the actual multifunctional nitroxide compound has been produced from the precursor materials, the solution of the multifunctional nitroxide compound may be used directly in a stable free radical polymerization process, or the multifunctional nitroxide compound may be isolated from its solution, and subsequently used in the stable free radical polymerization process. For example, the multifunctional nitroxide compound may be isolated from its solution by passing the solution of freshly synthesized compound through a column packed with a separation material such as silica gel, alumina, ion exchange resin, florisil or the like. The multifunctional nitroxide compound can be isolated by extraction, followed by precipitation with a non-solvent. Alternatively, the multifunctional nitroxide compound can be purified by sublimation. Similar purification techniques for isolating stable organic compounds, such as the multifunctional nitroxide compound, are known to those skilled in the art.

For example, in embodiments of the present invention where the solvent system is toluene it may be desirable to isolate the multifunctional nitroxide compound from the solvent system prior to polymerization of a polymerizable monomer or monomers using the multifunctional nitroxide compound. However, in embodiments of the present invention where the solvent system is the polymerizable monomer or monomers, such as styrene, it may be possible and even preferable to proceed directly to the stable free radical polymerization process without first isolating the multifunctional nitroxide compound from the solvent system. In this case, for example, the formation of the multifunctional nitroxide compound in a solvent of polymerizable monomers may be conducted at a reduced temperature, for example below about 60° C., followed by the stable free radical polymerization of the monomer in the same reactor vessel, for example at a temperature above about 60° C. Thus, in embodiments, the present invention provides for the in situ formation of telechelic, branched and star thermoplastic resin polymers. The present invention, in embodiments, thus provides a much more timely and economical process for the formation of such thermoplastic resin polymers.

Once the multifunctional nitroxide compound has been produced, it may be used to produce any of a wide variety of thermoplastic polymer resins such as telechelic, branched and star polymers by a stable free radical polymerization process. For example, the present invention may incorporate the stable free radical polymerization processes as disclosed in U.S. Pat. No. 5,322,912, the entire disclosure of which is incorporated herein by reference.

The present invention may therefore be used to form thermoplastic resin telechelic, branched and star polymers from a wide variety of monomers. The monomers that can be used may be any of the various monomers capable of undergoing a free radical polymerization, and include, but are not limited to, styrene, substituted styrene and derivatives thereof, for example methylstyrene, acrylates, butadiene, isoprene, myrcene, conjugated dienes and derivatives thereof, ethylene and derivatives thereof, mixtures thereof, and the like. Preferred are monomers that are sufficiently reactive under the specified stable free radical moderated polymerization reaction conditions to afford a stable free radical reaction adduct and high molecular weight polymer product. Also preferred are monomers that do not autopolymerize appreciably under the preferred reaction conditions.

The amount of multifunctional nitroxide compound used in the polymerization process is directly related to the amount of monomer or monomers to be polymerized. In embodiments of the present invention, the molar ratio of monomer content to multifunctional nitroxide compound may be in the range of from about 100:0.2 to about 10,000:2.5, and is preferably in the range of from about 300:1.3 to about 7,000: 1.3. However, it should be emphasized that the above ratios for the multifunctional nitroxide compound correspond to the amount of such compound that should be present in the reactor vessel upon commencing the stable free radical polymerization process. That is, in an in situ process, the specified molar ratios for the multifunctional nitroxide compound may not exactly correspond to the required molar ratio of precursor materials, due to the fact that the multifunctional nitroxide compound production step may not proceed with a 100% yield.

Additionally, the polymerization reaction rate of the monomer or monomers may, in embodiments of the present invention, be accelerated and the reaction time reduced by the addition of a catalyst. For example, a catalytic amount of a protic acid, which will not also initiate cationic polymerization, may be added to the reaction mixture. For example, the protic acid may be selected from the group consisting of organic sulfonic, phosphoric and carboxylic acids, with camphorsulfonic acid being preferred. When a catalyst is incorporated into the reaction mixture, the molar ratio of multifunctional nitroxide compound to catalytic acid may be from about 0.1: 1 to about 11: 1, with a preferred ratio of between about 1.5: 1 and about 5:1. Excessive addition of catalytic acid beyond the aforementioned amounts may cause the molecular weight distribution of the resultant polymers to broaden.

Additional optional known additives may be used in the polymerization reactions, provided they do not interfere with the objects of the present invention. Such additional additives may provide additional performance enhancements to the resulting product. Such optional additives may include, but are not limited to, colorants, lubricants, release or transfer agents, surfactants, stabilizers, defoamants, mixtures thereof and the like.

In embodiments, the thermoplastic resin polymers of the present invention are preferably polymerized in an inert atmosphere, i.e., with the virtual exclusion of oxygen. Embodiments of the present invention therefore conduct the stable free radical polymerization process in an inert atmosphere, such as under an argon or nitrogen blanket.

A further discussion of reaction conditions and reactants, including suitable monomers, stable free radical agents, catalysts, etc. may be found in U.S. Pat. No. 5,322,912, the entire disclosure of which has been incorporated by reference.

When the polymerization reaction is completed, or at a desired suitable percent conversion prior to completion, the polymerization reaction may be quenched or terminated by reducing the reaction temperature. For example, the polymerization reaction may be terminated by reducing the processing temperature to below about 100° C., and preferably below about 40° C.; although the exact temperature depends upon the specific reactants involved.

Following completion or termination of the reaction, the resultant polymer can be optionally separated from the reaction mixture, and washed and dried. Subsequent processing of the thermoplastic resin polymer can then be conducted.

The present invention provides several specific advantages in embodiments as follows.

With the process of the present invention, the stable free radical polymerization of polymer products may be conducted in situ with the formation of the multifunctional nitroxide compound from precursor materials. The present invention, in embodiments, permits both the formation of the multifunctional nitroxide compound and the polymerization of polymer products using the thus-formed compound in a single-step, single-reactor system. This so-called "Ein Topf" reaction may be used to produce narrow polydispersity polymer products in a much more efficient and economical fashion than in prior art processes.

With the process of the present invention, polymer product polydispersities can be varied from between about 1.1 to about 2.0, and preferably from between about 1.1 to about 1.5, depending on the monomer/comonomer system by varying the molar concentration ratio of the polymerization reaction components. For example, the process of the present invention may, in embodiments, provide a polystyrene polymer product having a polydispersity of between about 1.15 and about 1.25. When the polymerization process conditions of the present invention are attempted without using the multifunctional nitroxide compound or a stable free radical agent, broad molecular weight resins are obtained. Furthermore, as described above, the use of the multifunctional nitroxide compound in the stable free radical polymerization processes of the present invention enables the formation of telechelic, branched and star polymers and copolymers having a narrow polydispersity.

The stable free radical agent moderated polymerization reaction of the present invention may be performed in a variety of media such as, for example, suspension, emulsion, bulk, aqueous or non-aqueous solution. When solvent solutions are used in the polymerization process, it is preferable that higher boiling solvents be used, such as toluene and xylene.

In the multifunctional nitroxide compound formation step of the present invention, the reaction time may be varied over a period of up to about 48 hours, depending upon such factors as the precursor materials and reagents being used and the multifunctional nitroxide compound to be formed. Preferably, the reaction time for formation of the multifunctional nitroxide compound is below about 24 hours. The optimal reaction time may also vary depending upon the temperature, the volume and scale of the reaction, and the quantity of reactants selected. Generally, the preparation of the multifunctional nitroxide compound from the precursor materials may be conducted at a temperature of from about −40° C. to about 125° C., subject to the limitations of the solvent system. Preferably, the multifunctional nitroxide compound in the process of the present invention is prepared at a temperature of from about −20° C. to about 40° C. and even more preferably at a temperature of from about 1 to about 35° C.

In embodiments of the present invention, it is preferable to use the multifunctional nitroxide compound directly in a stable free radical polymerization process by introducing the polymerization reaction reactants directly into the reactor vessel, either before, during or after the multifunctional nitroxide compound formation reaction. During the reaction of monomer or mixed monomers to form polymers, the reaction time may be varied over a period of up to about 70 hours, preferably below about 10 hours and optimally below about 7 hours. More preferably, the reaction time is between about 3 hours and about 7 hours. The optimal reaction time may vary depending upon the temperature, the volume and scale of the reaction, the quantity and type of polymerization reactants selected, and the effects of any other reagents present during the polymerization process.

The polymerization reaction temperature may be kept relatively constant throughout the polymerization reaction step by providing an adjustable external heat source. The temperature of the reaction vessel is preferably maintained at between about 60° C. and about 160° C., and may preferably be maintained at between about 100° C. and about 150° C. Optimally, in embodiments, the temperature of the reaction vessel is maintained at from about 120° C. to about 140° C. It has been found that reactions performed for some monomers such as styrene above about 160° C. tend to result in a broadening of the polydispersity.

A reaction volume of the reactor vessel may be selected for any size that enables simple addition of reagents, mixing, reaction, and isolation of the product resins on an economic or convenient scale.

The following examples illustrate specific embodiments of the present invention, but do not limit the scope of the invention. One skilled in the art will recognize that the appropriate reaction parameters, reagents and component ratios may be adjusted as necessary to achieve specific stable free radical agent and/or polymer product characteristics. All parts and percentages are by weight unless otherwise indicated.

EXAMPLES

Example 1

This example demonstrates the formation of the multifunctional nitroxide compound 1,1'-bis-[2,2,6,6-tetramethylpiperidinyl-1-oxyl]-1,1-methyl-p-xylene, and the use of that compound in the subsequent in situ stable free radical polymerization of styrene.

A 100 mL round bottom flask equipped with a stirrer bar is placed in an ice bath. Into the flask are added 25 mL distilled styrene, 7.68 g TEMPO and 6.79 g $\alpha,\alpha'$-[di-2-bromoethyl]-p-benzene. A stream of argon gas is bubbled through the reacting medium to provide an inert atmosphere. Into a dropping funnel are added 10.7 g tri-butyl tin hydride (n-Bu$_3$SnH), which is then added into the reaction system dropwise over a 30 to 60 minute period. The addition of the hydride is slow enough so that the temperature of the system does not exceed 10° C. After complete addition of the tin hydride, the solution is stirred for an additional hour at 10° C. The temperature is then increased to 35° C. for 2 hours to force the reaction to go to completion. The initial color of the TEMPO/halide solution is red, but over the course of the reaction the solution turns pale yellow and then colorless. This indicates the completion of the formation of the multifunctional (here, difunctional) nitroxide compound, 1,1'-bis-[2,2,6,6-tetramethylpiperidinyl-1-oxyl] - 1,1'-methyl-p-xylene. This reaction corresponds to the reaction scheme (i) presented above.

The reaction conditions are next adjusted to proceed directly with the stable free radical polymerization of the styrene monomer. The temperature of the mixture is increased to between 140° C. and 150° C. to polymerize styrene by the stable free radical polymerization process. The result is a telechelic polystyrene polymer with a narrow polydispersity.

What is claimed is:

1. A free radical polymerization process for the preparation of a thermoplastic resin or resins, comprising:

forming a multifunctional nitroxide compound by reacting a stable free radical agent and a compound having two or more halide functional groups;

heating a mixture of said multifunctional nitroxide compound and at least one polymerizable monomer compound to form said thermoplastic resin or resins;

cooling said mixture;

optionally isolating said thermoplastic resin or resins; and optionally washing and drying said thermoplastic resin or resins.

2. A process according to claim 1, wherein said compound used to form said multifunctional nitroxide compound is a non-polymeric compound.

3. A process according to claim 1, wherein said thermoplastic resin or resins is a telechelic, branched or star polymer.

4. A process according to claim 1, wherein said compound used to form said multifunctional nitroxide compound has two reactive halide functional groups and said thermoplastic resin or resins is a telechelic polymer.

5. A process according to claim 1, wherein said compound used to form said multifunctional nitroxide compound has three reactive halide functional groups and said thermoplastic resin or resins is a branched polymer.

6. A process according to claim 1, wherein said compound used to form said multifunctional nitroxide compound has six reactive halide functional groups and said thermoplastic resin or resins is a star polymer.

7. A process according to claim 1, wherein said multifunctional nitroxide compound is formed by reacting a stable free radical agent and a compound having two or more halide functional groups at a temperature below about 60° C.

8. A process according to claim 7, further comprising reacting with said stable free radical agent and said compound having two or more halide functional groups a compound capable of generating hydride radicals under stable free radical polymerization process conditions.

9. A process according to claim 8, wherein said compound capable of generating hydride radicals is tributyl tin hydride.

10. A process according to claim 8, wherein said compound having two or more halide functional groups is selected from the group consisting of alkyl halide compounds, aryl halide compounds and alpha-keto halide compounds.

11. A process according to claim 1, wherein said stable free radical agent is selected from the group consisting of 2,2,5,5-tetramethyl-1-pyrrolidinyloxy, derivatives thereof, 2,2,6,6-tetramethyl-1-piperidinyloxy, derivatives thereof, 4,4-dimethyl-1-oxazolidinyloxy, derivatives thereof, and mixtures thereof.

12. A process according to claim 1, wherein said multifunctional nitroxide compound is formed in a solution of said polymerizable monomer and is not isolated from said solution prior to said heating step.

13. A process according to claim 1, wherein said multifunctional nitroxide compound is formed in a solution separate from said polymerizable monomer and is isolated from said solution prior to said heating step.

14. A process according to claim 1, wherein said heating step comprises heating said mixture at a temperature of from about 60° C. to about 160° C.

15. A process according to claim 1, wherein said thermoplastic resin has a molecular weight distribution of from about 1.1 to about 2.0.

16. A process according to claim 1, wherein said at least one polymerizable monomer compound is selected from the group consisting of styrene and derivatives thereof, conjugated dienes and derivatives thereof, acrylate and derivatives thereof, ethylene and derivatives thereof, and mixtures thereof.

17. A process according to claim 1, wherein said thermoplastic resin has a number average molecular weight of from about 1,000 to about 1,000,000.

18. A free radical polymerization process for the preparation of a thermoplastic resin or resins, comprising:

forming a multifunctional nitroxide compound by reacting a stable free radical agent, a compound having two or more halide functional groups, and a compound capable of generating hydride radicals, at a temperature below about 60° C.;

heating at a temperature of above about 60° C. a mixture of said multifunctional nitroxide compound and at least one polymerizable monomer compound to form said thermoplastic resin or resins;

cooling said mixture;

optionally isolating said thermoplastic resin or resins; and optionally washing and drying said thermoplastic resin or resins.

* * * * *